United States Patent
Popken

(10) Patent No.: US 10,266,132 B2
(45) Date of Patent: Apr. 23, 2019

(54) METHOD FOR OPERATING DRIVER ASSISTANCE SYSTEMS IN A MOTOR VEHICLE, AND MOTOR VEHICLE

(71) Applicant: AUDI AG, Ingolstadt (DE)

(72) Inventor: Markus Popken, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/750,307

(22) PCT Filed: Jul. 15, 2016

(86) PCT No.: PCT/EP2016/001236
§ 371 (c)(1),
(2) Date: Feb. 5, 2018

(87) PCT Pub. No.: WO2017/025169
PCT Pub. Date: Feb. 16, 2017

(65) Prior Publication Data
US 2018/0229672 A1 Aug. 16, 2018

(30) Foreign Application Priority Data
Aug. 8, 2015 (DE) .................. 10 2015 010 270

(51) Int. Cl.
*B60R 16/023* (2006.01)
*B60W 50/00* (2006.01)
(Continued)

(52) U.S. Cl.
CPC .......... *B60R 16/023* (2013.01); *B60W 40/04* (2013.01); *B60W 40/06* (2013.01);
(Continued)

(58) Field of Classification Search
CPC ............... B60R 16/023; B60W 40/04; B60W 2050/0098; B60W 2050/0089; B60W 2050/0083; B60W 2050/143
(Continued)

(56) References Cited

U.S. PATENT DOCUMENTS 8,483,906 B2 7/2013 Lucas et al.
8,781,688 B2 7/2014 Sandblom
(Continued)

FOREIGN PATENT DOCUMENTS

DE 102005002504 A1 7/2006
DE 102005009146 A1 9/2006
(Continued)

OTHER PUBLICATIONS

English-language abstract of German Patent Application Publication No. DE 102008061301 A1, published Jun. 18, 2009; 2 pages.
(Continued)

*Primary Examiner* — Isaac G Smith
(74) *Attorney, Agent, or Firm* — Sterne, Kessler, Goldstein & Fox P.L.L.C.

(57) ABSTRACT

An embodiment relates to a method for operating driver assistance systems in a motor vehicle. The embodiment operates by evaluating, using a first function of a first driver assistance system, a feature data structure of a central environment model used by the driver assistance systems. The feature data structure is related to an environmental feature, and the central environment model has a plurality of feature data structures. The evaluating by the first function outputs results data. A piece of result information representing a portion of the results data is added to the feature data structure in response to the evaluation of the feature data
(Continued)

structure. A second function of a second driver assistance system evaluates the feature data structure based on the piece of result information.

19 Claims, 2 Drawing Sheets

(51) Int. Cl.
    *B60W 50/06*     (2006.01)
    *B60W 40/04*     (2006.01)
    *B60W 40/06*     (2012.01)
    *B60W 50/14*     (2012.01)

(52) U.S. Cl.
    CPC ........ *B60W 50/0098* (2013.01); *B60W 50/06* (2013.01); *B60W 50/14* (2013.01); *B60W 2050/0083* (2013.01); *B60W 2050/0088* (2013.01); *B60W 2050/0089* (2013.01); *B60W 2050/143* (2013.01)

(58) Field of Classification Search
    USPC .......................................................... 701/23
    See application file for complete search history.

(56) References Cited

U.S. PATENT DOCUMENTS

| | | |
|---|---|---|
| 9,239,380 B2 | 1/2016 | Hegemann et al. |
| 2008/0162010 A1* | 7/2008 | Klotz ................. B60K 31/0008 701/93 |
| 2015/0154328 A1 | 6/2015 | Michalke et al. |
| 2016/0221575 A1 | 8/2016 | Posch et al. |
| 2017/0080950 A1* | 3/2017 | Pink ..................... G06K 9/6289 |

FOREIGN PATENT DOCUMENTS

| | | |
|---|---|---|
| DE | 102008061301 A1 | 6/2009 |
| DE | 102010048263 A1 | 5/2011 |
| DE | 102013215032 A1 | 11/2014 |
| DE | 102013223803 A1 | 5/2015 |
| EP | 2347400 B1 | 3/2014 |
| WO | WO 2009141092 A1 | 11/2009 |
| WO | WO 2015032508 A1 | 3/2015 |

OTHER PUBLICATIONS

English-language abstract of German Patent Application Publication No. DE 102010048263 A1, published May 19, 2011; 1 page.
English-language abstract of German Patent Application Publication No. DE 102013215032 A1, published Nov. 20, 2014; 2 pages.
International Search Report and Written Opinion of the International Searching Authority directed to related International Patent Application Publication No. PCT/EP2016/001236, dated Oct. 20, 2016, with attached English-language translation; 18 pages.
International Preliminary Report on Patentability directed to related International Patent Application No. PCT/EP2016/001236, dated Feb. 13, 2018, with attached English-language translation; 12 pages.

\* cited by examiner

METHOD FOR OPERATING DRIVER ASSISTANCE SYSTEMS IN A MOTOR VEHICLE, AND MOTOR VEHICLE

TECHNICAL FIELD

An embodiment relates to a method for operating driver assistance systems in a motor vehicle, wherein each of the driver assistance systems has at least one function that evaluates, as input data, at least one feature data structure of a central environment model that is used by all driver assistance systems and has a plurality of feature data structures, the at least one feature data structure being related to an environmental feature, and outputs results data. In addition, an embodiment relates to a motor vehicle.

BACKGROUND

Modern motor vehicles frequently comprise multiple driver assistance systems, which are intended to support the driver in various situations. These driver assistance systems, in particular jointly with ego data related to the operation of the host motor vehicle, evaluate environmental data, which can be ascertained, for example, by environment sensors of the motor vehicle, by a communication device or from digital map material. The respective input data of a function of the driver assistance system is usually checked against at least one measure criterion, wherein a corresponding measure is automatically carried out when the criterion is met. Measures may include the output of warnings to the driver as well as interventions in the driving operation, in particular transverse guidance interventions and/or longitudinal guidance interventions, or the change of operating parameters of at least one system of the motor vehicle. Known driver assistance systems, for example, relate to parking and maneuvering processes, longitudinal and transverse guidance assistance especially when driving at high speed, traffic jam assistance and, last but not least, safety functions of the motor vehicle, such as the protection of the motor vehicle as a whole and/or of certain components of the motor vehicle, such as the wheels/rims. Driver assistance systems related to lighting systems and the like are also known.

Since, especially with respect to environmental data, this data is often required by multiple driver assistance systems in the motor vehicle, it is proposed, within the meaning of information fusion and in particular sensor data fusion, to ascertain a central model of the environment from the environmental data, which the various driver assistance systems can access. Typical environment models are composed of a plurality of feature data structures, which each relate to an environmental feature and, for example, contain attributes related to the environmental feature. If the environmental feature is another road user, for example, a class of the road user, a speed of the road user, a driving direction of the road user, and a plurality of other properties of the road users may be used as associated attributes. Similar attribute associations are, of course, also conceivable for environmental features of another type. Within the scope of the function of driver assistance systems to evaluate measure criteria, the driver assistance systems may access feature data structures pertaining to relevant environmental features, and use these as part of the input data.

As technology advances, not only do the number of driver assistance systems increase, but so does the field of use thereof. For example, traffic jam assistance systems, which previously were limited to extremely low speeds for guiding a motor vehicle fully automatically through a traffic jam situation, can be used up to higher speeds, while on the other hand systems designed for high speeds, such as lane keeping assistant systems and/or longitudinal guidance systems comprising a follow function, can also be used at lower speeds. As the quality of environment sensors increases, it is also possible to use various safety systems that are geared toward protecting vehicle parts and the like against collisions for higher speed ranges and/or distance ranges. While this, on the one hand, increases the possibilities for assisting the driver, on the other hand this creates overlapping fields of use of driver assistance systems, in which these systems possibly evaluate identical environmental features and, within the scope of the functions thereof, arrive at identical, but possibly also different, conclusions. This may result in unintended dual warnings for the driver or in opposing other measures, in particular interventions in the driving operation. For example, when a driver assistance system watching intersecting traffic when pulling out of a parking space has detected a traversing vehicle and found this to be so relevant that a warning should be output, it may nonetheless happen that a safety system that is geared toward collision protection also considers the traversing vehicle to be relevant. This would then result in a dual warning, or even in a braking intervention in addition to the warning, even though the driver assistance system for monitoring intersecting traffic had intended a steering intervention to take the traversing vehicle into consideration. This results in unintended effects triggering confusion in a driver.

SUMMARY

It is the object of the invention to enable a better coordinated operation of driver assistance systems in a motor vehicle.

To achieve this object, it is provided according to an embodiment, a method of the type mentioned at the outset that, following the evaluation of a feature data structure by a function, a piece of result information describing at least a portion of the results data is added to the feature data structure and, during the evaluation of a feature data structure comprising a piece of result information by a function, the piece of result information is taken into consideration in the function.

In this way, it is achieved that the individual driver assistance systems through the functions thereof leave behind a kind of "feedback" about the individual environmental features, which in particular relates to measures carried out and/or assessments of the environmental feature. Consequently, the idea of fusion, from which the concept of the environment model arose, is expanded to include the actions and conclusions of the driver assistance systems in that the assessment of the individual driver assistance systems regarding the content of the environment model, such as obstacles, dynamic objects and the like, is attached to the feature data structure associated therewith. The assessment in the form of the results data is therefore present in a central location, namely in the environment model, and may be read accordingly by the other driver assistance systems.

Other driver assistance systems thus receive a piece of additional information, which is specifically associated with a feature and describes how the driver assistance system leaving the results data behind has assessed the environmental feature. In a first, simple abstraction, a kind of "warning level" may be left behind as results data, which indicates how relevant the driver assistance system, which has already evaluated the feature data structure, considered the environmental feature to be. For example, a distinction may be made here between different warning stages and intervention stages. When another driver assistance system, through the function thereof which requires the same feature data structure as input data, establishes that it reaches the same or a lower warning level in the results data thereof, it can assume that the corresponding necessary measures were taken by the previously evaluating driver assistance system. In this way, it is possible to avoid dual warnings or the like, for example. On the other hand, when a higher warning level is achieved, it is still possible, of course, to carry out its own measures. It is also within the scope of the invention to add more complex results data, such as results data broken down in greater detail, to the feature data structures.

The procedure according to an embodiment in particular allows complex, bilateral communication processes between individual driver assistance systems to be dispensed with, which usually would not have produced the desired informational content regardless. The reason is that the measures alone do not yet contain any information as to the data on which these measures are based; in such a case, an inquiring driver assistance system may still be required to reconstruct all the deliberations made by the driver assistance system, which is no longer necessary due to the clear association and central availability of the corresponding information in the form of the added piece of result information.

An advantageous refinement of an embodiment provides for a piece of result information to be added to an evaluated feature data structure only when a feature criterion indicating the relevance for other functions and evaluating the results data is met. This means that not all results data that arises necessarily must be relevant for other driver assistance systems, so that in this way overloading of the environment model with unnecessary pieces of information can be avoided. If it is established, for example, that an environmental feature was rated as irrelevant for a certain driver assistance system, this does not necessarily have to be noted since no measures have taken place which other driver assistance systems may need to allow for. Moreover, the feature criterion can also check the relevance of results data as to whether a multiple evaluation/application of an algorithm may possibly be avoided since the results data can be used further. If this is (possibly likewise) not the case, no information must be stored.

The piece of result information preferably comprises a time stamp describing the completion of the underlying evaluation. In this way, it is likewise possible to allow for the up-to-date nature of the piece of result information in the driver assistance systems that are taking this information into consideration. If, for example, a preceding warning has already taken place considerably earlier, and no further subsequent measures have occurred, but the reason for the warning still exists, it is certainly nonetheless advantageous to output a warning even in the case of an evaluation by a further function in another driver assistance system. As a result, it may in particular be provided that, during a subsequent evaluation of the feature data structure, a piece of result information only influences the results data when a drop below an in particular function-specific time threshold since the time stamp has occurred. In this way, the pieces of result information are given a kind of validity time frame, which may be selected in a function-specific manner.

In an embodiment, the piece of result information can describe at least one measure triggered by the function based on the results data. This may in particular also take place in an abstract manner, for example when the aforementioned warning level, which is to say a measure classification, is used as the piece of result information, having certain measures associated with the various stages (e.g., warning stages, intervention stages, and the like). When accessing the feature data structure, other functions or driver assistance systems thus have knowledge as to which measures have already been taken with respect to this environmental feature, so that the relevance or meaningfulness of the system's own measures can be checked and/or these can be adapted/suppressed.

One refinement of an embodiment provides that, without taking the piece of result in-formation into consideration, measures of the evaluating function that are carried out as a result of an evaluation are modified and/or suppressed by taking the piece of result information describing the at least one measure of the preceding evaluations into consideration. At an abstract level, this means that, on the one hand, it is possible to avoid measures, such as warnings, that are repeated, but that on the other hand it is also possible to achieve a central coordination of measures, whereby in particular opposing actions of different functions do not occur, which could appear incongruent to a driver.

In some embodiments, for example, it may be provided that, when the criticality of a traffic situation is lowered by the measure of the preceding evaluation in a way that exceeds a threshold, the measures are reduced and/or suppressed, and/or when the criticality of the traffic situation is lowered by the measure of the preceding evaluation in a way that does not exceed the threshold, the intensity in particular of measures serving as warnings is increased. Thus, if it is established in this example that the preceding measure has already lowered the criticality of the traffic situation, the subsequent measure no longer must be as drastic or may be entirely refrained from. However, if it is established that the measure does not really change the criticality of the traffic situation, this measure is carried out in any case, and perhaps the intensity thereof is increased. In particular, it is possible to specifically adapt the intensity of warning levels, in particular while appropriately taking the time stamp into consideration. For example, two consecutively occurring warnings of the same warning level may prompt a modification of the second warning to the next higher warning level, which can, of course, be implemented in a function-specific manner.

As was already indicated, it is particularly advantageous in this context when, in the case of measures describing driving interventions, the measures that follow from the subsequent evaluation are adapted so as to take the measure of the preceding evaluation into consideration. For example, when a driver assistance system tends to take an environmental feature into consideration by circumnavigation using steering interventions, it makes little sense for a second driver assistance system to carry out a braking process all the way to a standstill, but it is possible, for example as a modification, to only reduce the speed of the motor vehicle so as to increase overall safety and increase the driver's alertness with respect to a possibly critical traffic situation. On the other hand, when both functions arrive at the conclusion that a certain driving intervention is necessary, for example normally when respective braking interventions are provided as measures during the preceding evaluation and the subsequent evaluation, a modification of the second braking intervention may then take place in such a way that the braking action of the preceding measure is observed and the like.

A general, advantageous refinement of an embodiment provides for at least one results date and/or intermediate result of the preceding evaluation, which is also required in a subsequently evaluating function, to be stored in the piece of result information and to be used by the subsequently evaluating function, avoiding its own ascertainment. For example, when multiple functions or driver assistance systems use comparable algorithms to ascertain certain pieces of information related to an environmental feature, such as license plate identification and the like, it is possible, when the algorithm was already used and the appropriate results date or intermediate result is available, for this to be stored in the piece of result information and this may also be used accordingly by other driver assistance systems, saving computing time and effort.

Advantageously, an object-based environment model may be used, wherein each of the feature data structures describes a detected object including associated attributes. Such object-based environment models may ultimately contain, as environmental features, feature data structures that describe objects having relative positions to the motor vehicle and that include accordingly associated attributes. This is in contrast to occupancy grid mapping and the like, for example, in which the affiliation with a certain environmental feature/object can be found in the attributes, provided the grid cell itself is not the environmental feature. In addition, mixed forms of grid-based and object-based environment models exist, which, of course, can also be used within embodiments. However, a certain object reference may prove to be advantageous since evaluations of functions frequently relate to certain objects as environmental features, and the piece of result information can thus be located within the environment model in a target-oriented manner.

It is advantageous, as was already set out, when the environment model is ascertained by way of fusion of all environmental data present in the motor vehicle, comprising in particular sensor data and/or communication data and/or digital map data. In this way, the environment model already forms a central point of contact for the functions of the driver assistance systems to provide suitable input data and is accordingly used as a central point of contact for the coordination of the driver assistance systems among one another.

In addition to the above method, some embodiments also relate to a motor vehicle, comprising multiple driver assistance systems including at least one associated control device, which is designed to carry out the method. All comments made with respect to the method can analogously also be applied to the motor vehicle according to some embodiments, which consequently also allows the aforementioned advantages to be achieved.

In principle, it is conceivable to design the control device as a control device of a so-called central driver assistance system, which carries out the functions of all driver assistance systems combined, and in particular also creates, updates and manages the environment model. However, it is also conceivable, of course, to utilize multiple control devices, which are associated with a driver assistance system or a function, or to implement certain functions distributed among multiple control devices.

Further advantages and details of embodiments will be apparent from the embodiments described hereafter and based on the drawings.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

Figure 1:
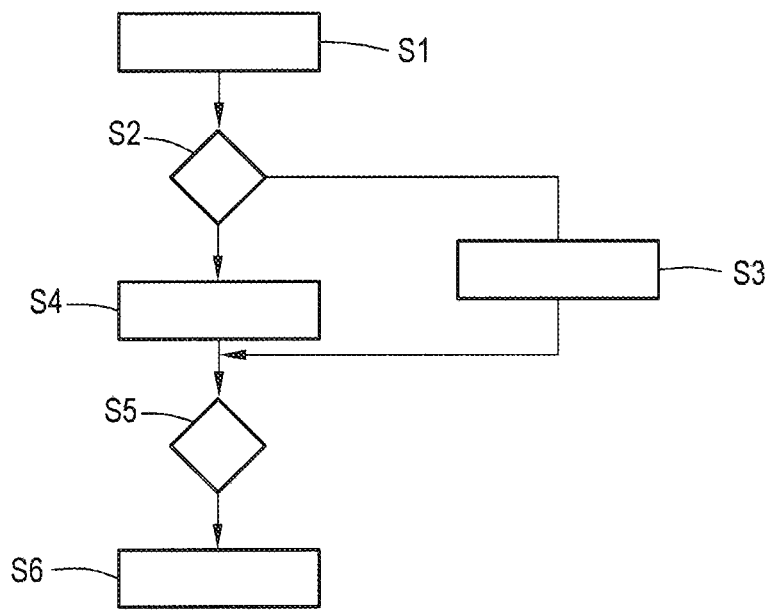
FIG. 1 shows a flow chart of a method which allows coordination among different driver assistance systems, according to some embodiments.

FIG. 1 shows a flow chart of the method according to some embodiments, which allows coordination among different driver assistance systems, or more specifically of the functions thereof, in a motor vehicle in that feedback in the form of a piece of result information is provided to a central environment model, which is used collectively by the driver assistance systems and was ascertained based on all available environmental data in the motor vehicle, when a driver assistance system evaluates a feature data structure associated with an environmental feature. The feedback is then used by further functions.

For a more detailed description, step S1 represents the start of the evaluation of a measure criterion, which uses, as input data, at least one feature data structure of the environment model which is related to an environmental feature, so as to generate results data related in particular to the execution of at least one measure. For example, the driver assistance system can be a safety system that is to prevent collisions of the motor vehicle with environmental features, here in particular objects such as obstacles and other road users. The function of the driver assistance system then polls the environment model, which is object-based in some embodiments, for corresponding environment features that may possibly be collision objects and the feature data structures from the central environment model.

In step S2, it is checked whether a portion of the feature data structure for the at least one environmental feature already forms a piece of result information that describes results data of another function. If this is not the case, the evaluation in step S3 takes place essentially as is known, and without modification. However, if at least one piece of result information is available, the feature data structure is evaluated, and consequently the results data is ascertained taking the piece of result information into consideration, wherein multiple types of consideration of the piece of result information are conceivable, if this piece of information is relevant for the corresponding function to begin with.

The piece of result information can include at least one results date and/or an intermediate result of a certain algorithm, which could also be used by the presently evaluating function. In particular, the algorithm yields a certain result independent of the time, for example the identification of a license plate or the like. The algorithm then no longer must be carried out in the presently executing function, but the result contained in the piece of result information may be utilized.

In particular, however, the piece of result information influences measures to be carried out compared to the evaluation in step S3 without consideration of a piece of result information. For this purpose, the piece of result information in particular comprises the description of at least one measure that was carried out as a result of the preceding evaluation. This information may be encoded in specific or abstract terms, wherein in particular a warning level may be used for abstract coding. For example, a certain number of warning stages, in which a warning of increasing intensity is output to the driver, and a certain number of intervention stages, in which driving interventions having increasing intensity are carried out, may be included. If, for example, the presently evaluating function establishes that a warning of a certain warning stage is to be carried out, it can be checked whether this warning stage is the same as or lower than the warning stage in the preceding evaluation. Since the piece of result information is also stored with a time stamp, the time component may also be taken into consideration. If a warning of a higher warning stage or of the same warning stage has already been output, the intensity of the warning may be decreased or the warning may even be entirely suppressed. In critical circumstances, however, it may also be provided to increase the warning stage in special instances, in particular when the preceding measure has not lowered in the criticality of the traffic situation.

With respect to driving interventions, it is particularly advantageous when the actual measures are stored as a piece of result information, since then it is possible to ensure, for example, that driving interventions ideally complement one another. For example, if previously a less powerful braking process has taken place, the intensity thereof may now be deducted from a now ascertained more powerful braking intervention, whereby the intensity of the ultimately desired braking intervention is pre-served, and braking is not too powerful. The procedure for steering interventions may be similar; in addition to driving interventions, it is incidentally also useful to have knowledge of the parameterization of certain vehicle systems.

In an embodiment of the collision protection system already mentioned with respect to step S1, for example, a piece of result information of a driver assistance system that monitors traversing traffic when pulling out of a parking space may be present, which has just output a warning of a certain warning stage. If the collision protection system now establishes that it would again issue a warning of the same warning stage immediately thereafter, this warning may be suppressed. The action may also be similar for driving interventions. If it is known from the piece of result information that the other driver assistance system plans to circumnavigate an obstacle using steering inventions, braking all the way to a standstill would constitute an opposing measure that does not fit the overall event and can be suppressed or reduced.

In step S5, it is checked within the scope of a feature criterion evaluating the results data whether the results data of the present evaluation could be relevant for other functions, and consequently for other driver assistance systems. Only if this is the case, which is to say if a measure was carried out to begin with or a reusable other result was obtained, will a piece of result information be generated and added to the environment model, or more specifically to the feature data structure, in step S6.

Figure 2:
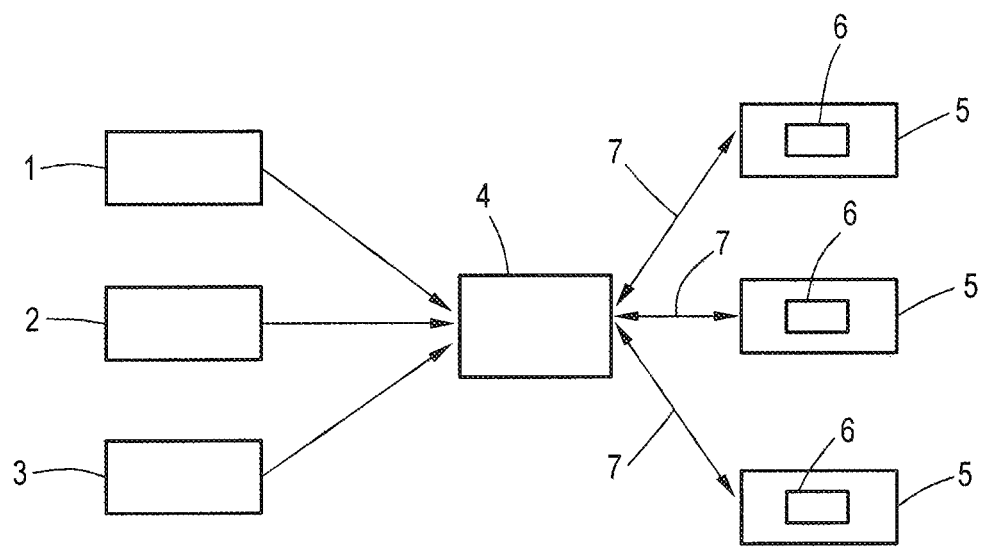
FIG. 2 shows a chart to explain the concept underlying some embodiments.

FIG. 2 shows a chart to illustrate the concept underlying some embodiments. Environmental data of sensors 1, communication devices 2 and digital map material of a navigation system 3 is centrally combined in an environment model 4 and made available to a plurality of driver assistance systems 5 or the functions 6 thereof. However, the driver assistance systems 5, as is symbolized by the double arrows 7, also provide feedback in the form of the piece of result information, which can be used by other driver assistance systems 5 or the functions 6 thereof.

Figure 3:
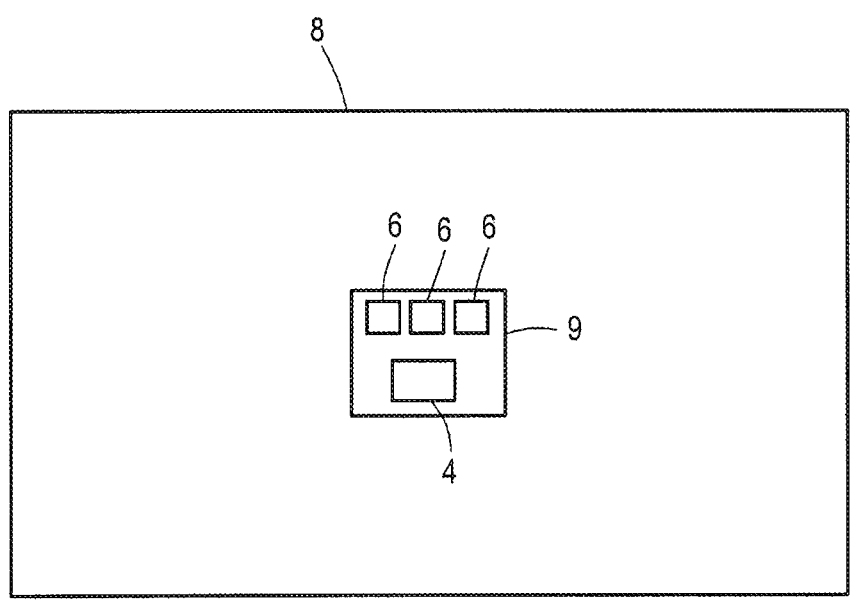
FIG. 3 shows a motor vehicle according to some embodiments.

FIG. 3 finally shows a schematic diagram of a motor vehicle 8 according to the some embodiments, comprising a central control device 9, which creates, updates and manages the environment model 4 and also implements the functions 6 of the driver assistance systems 5. The control device 9 is designed to carry out the method according to the invention.

The various partial aspects can, of course, also be implemented in a distributed manner by different control devices 9.

The invention claimed is:

1. A method for operating driver assistance systems in a motor vehicle, comprising:
    performing, by a first function of a first driver assistance system, a first evaluation of a feature data structure of a first data type of a central environment model used by the driver assistance systems, wherein the performing the first evaluation outputs results data, the central environment model comprises a plurality of feature data structures, and the central environment model is established by fusing environmental data present in the motor vehicle, wherein the environmental data comprises sensor data, communication data, or digital map data;
    adding, by the first driver assistance system, a piece of result information representing a portion of the results data to the feature data structure of the first data type in response to the performing the first evaluation of the feature data structure of the first data type; and
    performing, by a second function of a second driver assistance system, a second evaluation of the feature data structure of the first data type based on the piece of result information.

2. The method of claim 1, wherein the adding comprises:
    adding, by the first driver assistance system, the piece of result information to the feature data structure in response to a feature criterion indicating a relevance of the results data to the second function of the second driver assistance system.

3. The method of claim 1, wherein the piece of result information comprises a time stamp describing a time of completion for the performing the first evaluation of the feature data structure by the first function.

4. The method of claim 3, wherein during the performing the second evaluation of the feature data structure based on the piece of result information, the piece of result information influences the results data when the time stamp associated with the piece of result information is less than a function-specific time threshold.

5. The method of claim 1, wherein the piece of result information describes a measure of the first function that is triggered based on the results data.

6. The method of claim 5, further comprising:
    modifying, by the second driver assistance system, the measure of the first function based on a second piece of result information describing a measure of the performing the second evaluation, wherein the modifying of the measure of the first function is performed without taking the piece of result information into consideration.

7. The method of claim 6, wherein the modifying comprises:
    in response to a criticality of a traffic situation being lowered by the measure of the performing the second evaluation in a way that exceeds a threshold, reducing the measure of the first function; and
    in response to a criticality of a traffic situation being lowered by the measure of the performing the second evaluation in a way that does not exceed the threshold, increasing an intensity of the measure of the first function, wherein the measure of the first function serves as a warning.

8. The method of claim 7, further comprising:
adapting, by the second driver assistance system, a measure that follows from the performing the second evaluation based on a measure of the performing the first evaluation, wherein the measure that follows the performing the second evaluation describes a driving intervention.

9. The method of claim 1, further comprising:
storing, by the first driver assistance system, a results date or an intermediate result of a the performing the first evaluation in the piece of result information for use during the performing the second evaluation thereby avoiding a determination of the piece of result information, wherein the results date or the intermediate result of the performing the first evaluation is required during the performing the second evaluation.

10. The method of claim 1, wherein the central environment model comprises an object-based environment model, and each feature data structure of the plurality of feature data structures describes a detected object including associated attributes.

11. A motor vehicle, comprising:
a plurality of driver assistance systems including an associated control device, wherein the control device is configured to:
perform, by a first function of a first driver assistance system of the plurality of driver assistance systems, a first evaluation of a feature data structure of a first data type of a central environment model used by the plurality of driver assistance systems, wherein the performing the first evaluation outputs results data, the central environment model comprises a plurality of feature data structures, and the central environment model is established by fusing environmental data present in the motor vehicle, wherein the environmental data comprises sensor data, communication data, or digital map data;
add, by the first driver assistance system, a piece of result information representing a portion of the results data to the feature data structure of the first data type in response to the performing the first evaluation of the feature data structure of the first data type; and
perform, by a second function of a second driver assistance system of the plurality of driver assistance systems, a second evaluation of the feature data structure of the first data type based on the piece of result information.

12. The motor vehicle of claim 11, wherein to add the piece of result information, the first driver assistance system is configured to:
add the piece of result information to the feature data structure in response to a feature criterion indicating a relevance of the results data to the second function of the second driver assistance system.

13. The motor vehicle of claim 11, wherein the piece of result information comprises a time stamp describing a time of completion for the performing the first evaluation of the feature data structure by the first function.

14. The motor vehicle of claim 13, wherein during the performing the second evaluation of the feature data structure based on the piece of result information, the piece of result information influences the results data when the time stamp associated with the piece of result information is less than a function-specific time threshold.

15. The motor vehicle of claim 11, wherein the piece of result information describes a measure of the first function that is triggered based on the results data.

16. The motor vehicle of claim 15, the second driver assistance system further configured to:
modify the measure of the first function based on a second piece of result information describing a measure of the performing the second evaluation, wherein the modifying of the measure of the first function is performed without taking the piece of result information into consideration.

17. The motor vehicle of claim 16, wherein to modify the measure of the first function, the second driver assistance system is configured to:
in response to a criticality of a traffic situation being lowered by the measure of the performing the second evaluation in a way that exceeds a threshold, reduce the measure of the first function; and
in response to a criticality of a traffic situation being lowered by the measure of the performing the second evaluation in a way that does not exceed the threshold, increase an intensity of the measure of the first function, wherein the measure of the first function serves as a warning.

18. The motor vehicle of claim 17, the second driver assistance system further configured to:
adapt a measure that follows from the performing the second evaluation based on a measure of the performing the first evaluation, wherein the measure that follows the performing the second evaluation describes a driving intervention.

19. The motor vehicle of claim 11, the first driver assistance system further configured to:
store a results date or an intermediate result of the performing the first evaluation in the piece of result information for use during the performing the second evaluation thereby avoiding a determination of the piece of result information, wherein the results date or the intermediate result of the performing the first evaluation is required during the performing the second evaluation.

* * * * *